3,113,962
5-ACETYLGLYCOLYL SALICYLIC ACID AND THE METHYL ESTER THEREOF
André Buzas, 25 Rue Leon Mignotte, Bievres, France
No Drawing. Filed Apr. 2, 1962, Ser. No. 184,531
Claims priority application France Apr. 27, 1961
3 Claims. (Cl. 260—473)

This invention relates to novel derivatives of salicylic acid and to one of its esters, namely methyl salicylate, and to a process for the preparation of these products.

The anti-inflammatory properties of salicylic acid are of no use for internal treatment because of the very large keratolytic power of salicylic acid, and so some of its derivatives are used for this purpose, such as sodium salicylate or aspirin, which have reduced keratolytic power and which can therefore be given internally. Another salicylated derivative, methyl salicylate, is useful for external treatments but cannot be given internally because of its very penetrating smell. These substances, however, which have useful anti-inflammatory properties inter alia in rheumatology, do have a residual keratolytic power and so their use sometimes leads to burns or to intolerances.

It is an object of this invention to provide therapeutically useful and substantially non-keratolytic salicylated derivatives. It is another object of this invention to prepare salicylated derivatives having a greater anti-inflammatory action than the prior art derivatives. It is another object of the invention to provide odourless salicylated derivatives.

The products covered by the invention are salicylated derivatives having a glycolyl side chain and of the formula

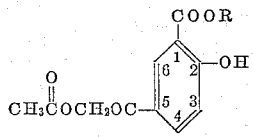

where R denotes either hydrogen or a methyl radical.

The first of such derivatives, corresponding to R being hydrogen, formed by 3-carboxy-4-hydroxy phenylethanolone, which can also be called acetylglycolyl-5-salicylic acid, has a melting point of from 190 to 194° C. The second derivative, corresponding to R being methyl, and formed by the methyl ester of 3-carboxy-4-hydroxy phenylethanolone, which can also be called methyl ester of acetylglycolyl-5-salicylic acid, has a melting point of from 81–83° C. These derivatives, which will hereinafter be referred to as I and II respectively, can be prepared in a crystallized state. The acid and phenol functions can be identified by conventional methods. The ethanolone function is shown by the derivative reducing ammonium silver nitrate (Tollens' reagent) (Anal. Chem. 25, 640–642, 1953).

The novel derivatives have considerable anti-pyretic, analgesic, anti-inflammatory and anti-arthritic activity which makes them of use in veterinary and human therapeutics. Pharmacological tests show that the novel derivatives are of very low toxicity, doses of 1 g./kg. in mice not being lethal. Also, being devoid of keratolytic action the novel derivatives are readily tolerated and can therefore be equally well administered orally as in the form of local applications. Chemical experiments have shown that ointments or the like prepared from derivatives I and II have been found not to cause erythemas in local applications; indeed, when they are applied to persons suffering from erythemas, the pain is lessened and the erythema is reduced. For instance, derivative I has been found statistically to be twice as active as a conventional salicylated ointment in the treatment of a local irritation produced by mustard essence. Clinical experiments on patients suffering from various algias showed that excellent results in 70.5% of the cases were achieved by applications of the ointment or the like. With regard to ingestion per os, disappearance of headaches and a lowering of temperature was found to occur in most of the patients treated.

In short, therefore, the derivatives according to the invention when given internally have an antipyretic action which is more rapid than, and as prolonged as and as intense as, aspirin, not to mention their anti-inflammatory and anti-algic action. When applied locally the derivatives according to the invention have a greater analgesic action than does glycol salicylate and they also have a very considerable anti-inflammatory action. Derivatives I and II are therefore particularly indicated for the treatment of rheumatic ailments.

The pharmaceutical conditioning of derivatives I and II is not difficult, the derivatives being incorporated with supports and vehicles in accordance with formulae which are familiar to the experts in the art. For instance, the products can be presented in the form of tablets or suppositories containing 0.50 g. of active substance, or they can be prepared in the form of syrups or suspensions with 5% active substance content or in the form of ointments and pomades of the same concentration. Ingestion is arranged to give a daily absorption of from 1 to 6 g.

The following composition may be mentioned as an example of a pomade to be applied to the skin:

|  | G. |
|---|---|
| Derivative I or II | From 5–10 |
| Polyoxyethylenated olive oil | 10 |
| Paraffin oil | 10 |
| Polyoxyethylenated stearo-cetyl alcohol | 10 |
| Perfume | 0.5 |
| Distilled water, q.s.f | 100 |

The derivatives according to the invention can be prepared by reaction of an alkali metal acetate with a 5-halogen-acetophenone in the presence of a solvent. Preferably, potassium acetate is used and is reacted with bromo-acetophenone or with chloro-acetophenone. Advantageously, the solvents can be methyl or ethyl alcohols or acetic acid.

The reaction has the reference III in the formula table to be given hereinafter, in which table the symbols R, M and Hal have the meanings given.

The bromo- and chloro-acetophenones of salicylic acid and of methyl salicylate are derivatives known per se which can be prepared by various methods, such as:

(1) By the action of bromo- or chloro-acetyl chloride in the presence of anhydrous AlCl$_3$ on salicylic acid or on methyl salicylate (Comptes Rendus, 234, 1058 (1952)) (Reaction A of the formula table);

(2) By Fries migration on bromo- or chloro-acetyl salicylic acid (or on methyl bromo- or chloro-acetyl salicylate) (Reaction B of formula table);

(3) By Fries migration with acetyl salicylic acid (J. Ind. Chem. Soc., 36, 235, 1949) followed by bromination, this latter stage of the reaction being performed by the method described in Org. Synth. II, 480, for brominating acetophenone. (Reaction C of the formula table)

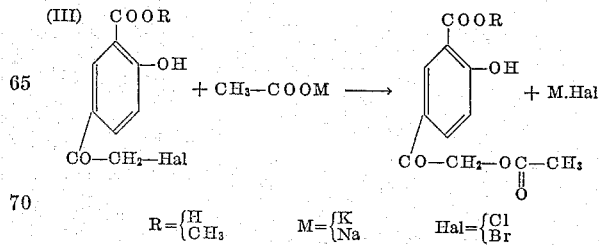

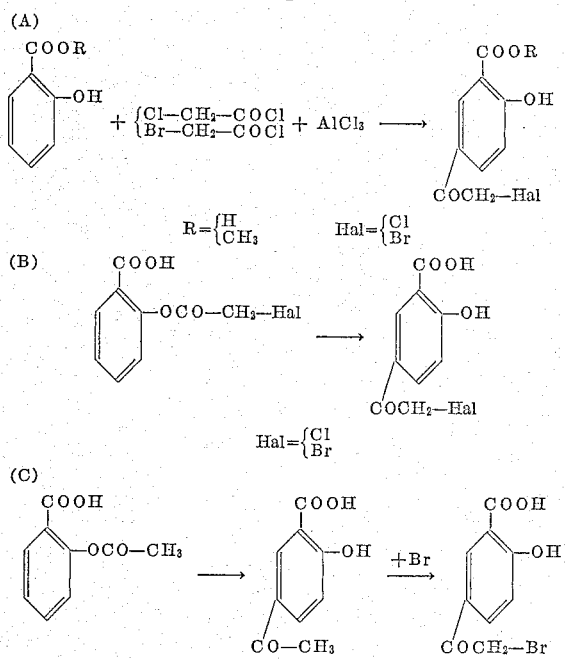

The following examples illustrate the invention.

EXAMPLE 1

*Preparation of 3-Carboxy-4-Hydroxy-Phenyl-Ethanolone (I)*

(a) Fries migration: 150 g. of acetyl salicyclic acid are added in small portions and with agitation to a mixture of 345 g. of anhydrous aluminium chloride and 1700 cc. of nitrobenzene. The mixture is allowed to react at ambient temperature for 4 hours, then poured into a mixture of ice and 200 cc. of concentrated hydrochloric acid. The product which is precipitated is centrifuged, then purified by being dissolved in a solution of $Na_2CO_3$ and reprecipitated by an addition of acid. 113 g. of 3-carboxy-4-hydroxy-acetophenone are yielded which, after recrystallization in a mixture of acetic acid and water has a melting point of from 216–218° C.

(b) Bromination: 0.5 g. of anhydrous aluminium chloride, followed by 16.7 g. of bromine, are added, with agitation and with the temperature being maintained at 30° C., to a solution of 19.5 g. of 3-carboxy-4-hydroxy-acetophenone in 250 cc. of anhydrous dioxan. After the reaction the solvent is concentrated and crystallization is effected. 28 g. of 3-carboxy-4-hydroxy-bromo-acetophenone are yielded which, after recrystallization in ether, yields 20 g. of product having a melting point of 159° C.

(c) Treatment with potassium acetate: 14.6 g. of 3-carboxy-4-hydroxy-bromoacetophenone and 13.5 g. of anhydrous potassium acetate are boiled with reflux in 200 cc. of absolute ethyl alcohol for 1 hour. After the reaction the potassium bromide is filtered and the mixture is evaporated in vacuo until dry. The residue is taken up with ether and 10% hydrochloric acid until an acid reaction is noted. The ether extract is washed with water, dried over sodium sulphate and then evaporation treatment is given. The residue is crystallized in ethyl acetate. 8 g. of product having a melting point of from 190 to 194° C. are yielded.

EXAMPLE 2

*Preparation of the Methyl Ester of 3-Carboxy-4-Hydroxy-Phenylethanolone (II)*

(a) Esterification: 90 g. of 3-carboxy-4-hydroxyacetophenone dissolved in 200 cc. of absolute methanol are boiled in the presence of 20 cc. of concentrated sulphuric acid for 5 hours, whereafter vacuum evaporation treatment is given, the residue is taken up with iced water and ether extraction treatment is given. The ether solution is washed first in water, to remove the sulphuric acid, then with a sodium bicarbonate solution to remove unesterified product. The mixture is then dried on sodium sulphate and evaporation treatment is given until the mixture is dry. The residue is crystallized in petroleum ether-ethyl acetate. 7 g. of product having a melting point of from 60–61° C. are yielded.

(b) Bromination: Working as in Example 1, the methyl ester of 3-carboxy-4-hydroxy-bromoacetophenone having a melting point of 95–96° C., is yielded.

(c) Treatment with potassium acetate: 10 g. of 3-carboxy-4-hydroxy-bromoacetophenone methyl ester and 5.5 g. of anhydrous potassium acetate are boiled in 100 cc. of acetic acid for 3 hours. The product is evaporated in vacuo until dry and the residue is dissolved in a mixture of ether and water; the ether is washed with water, the product is dried on sodium sulphate and concentrated until crystallization. 7 g. of product having a melting point of from 81–85° C. are yielded.

The same products can be prepared starting from 3-carboxy-4-hydroxy-chloroacetophenone (M.P.=165° C.) by treatment with sodium acetate in the same conditions as set forth in Example 1(c). Similarly, 3-carboxy-4-hydroxy-chloroacetophenone methyl ester can be prepared by the action of sodium acetate in conditions similar to those in Example 2(c).

What I claim is:

1. Derivatives of salicylic acid having an acetylglycolyl side chain of the formula

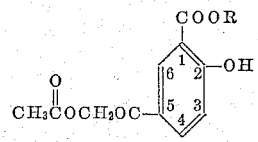

where R is selected from the group consisting of hydrogen and methyl radical.

2. 5-acetylglycolyl salicylic acid.
3. The methyl ester of 5-acetylglycolyl salicylic acid.

References Cited in the file of this patent

UNITED STATES PATENTS 2,939,886     Pritchard et al. _____ June 7, 1960

OTHER REFERENCES

Granger et al.: Comptes Rendus, 234, pp. 1058–1060 (1952).